United States Patent
Kaehler et al.

(10) Patent No.: US 12,017,494 B2
(45) Date of Patent: Jun. 25, 2024

(54) FASTENING ARRANGEMENT OF A VIBRATION DAMPER

(71) Applicant: Bayerische Motoren Werke Aktiengesellschaft, Munich (DE)

(72) Inventors: Martin Kaehler, Munich (DE); Marc Klingner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 567 days.

(21) Appl. No.: 17/285,358

(22) PCT Filed: Sep. 16, 2019

(86) PCT No.: PCT/EP2019/074678
§ 371 (c)(1),
(2) Date: Apr. 14, 2021

(87) PCT Pub. No.: WO2020/078635
PCT Pub. Date: Apr. 23, 2020

(65) Prior Publication Data
US 2021/0370736 A1    Dec. 2, 2021

(30) Foreign Application Priority Data
Oct. 15, 2018   (DE) .................. 10 2018 125 459.8

(51) Int. Cl.
*B60G 13/00* (2006.01)
*F16F 1/38* (2006.01)

(52) U.S. Cl.
CPC ......... *B60G 13/005* (2013.01); *B60G 13/003* (2013.01); *F16F 1/3842* (2013.01);
(Continued)

(58) Field of Classification Search
CPC ............... B60G 13/005; B60G 13/003; B60G 2204/128; B60G 2204/129;
(Continued)

(56) References Cited

U.S. PATENT DOCUMENTS 1,955,841 A * 4/1934 Tryon ............... B60G 11/12
267/270
2,048,256 A * 7/1936 Geyer ............... F16F 1/3835
403/228
(Continued)

FOREIGN PATENT DOCUMENTS

CN    101293471 A    10/2008
CN    103171416 A    6/2013
(Continued)

OTHER PUBLICATIONS

Chinese Office Action issued in Chinese application No. 201980062532.9 dated Mar. 9, 2022, with English translation (Sixteen (16) pages).

(Continued)

*Primary Examiner* — Xuan Lan Nguyen
(74) *Attorney, Agent, or Firm* — Crowell & Moring LLP

(57) ABSTRACT

A fastening arrangement of a vibration damper of a vehicle includes a rubber bearing with a first bush and a second bush, a fastener where via the fastener one of the first bush and the second bush of the rubber bearing is fixed in three degrees of longitudinal freedom with regard to a wheel support of the vehicle or the body of the vehicle, and a measure disposed on the second bush and on the wheel support or on the body of the vehicle where via the measure a degree of rotational freedom of the second bush about an axis of the fastener is blocked by a positively locking block. The positively locking block is formed by a convexly curved cylinder segment of the second bush and a concavely curved (Continued)

cylinder segment of the wheel support or the body of the vehicle that are engagable into one another.

12 Claims, 4 Drawing Sheets

(52) U.S. Cl.
CPC .. *B60G 2204/128* (2013.01); *B60G 2204/129* (2013.01); *B60G 2204/41* (2013.01); *B60G 2204/42* (2013.01); *B60G 2204/4404* (2013.01); *B60G 2206/50* (2013.01); *B60G 2206/8102* (2013.01); *B60G 2206/81022* (2013.01); *B60G 2206/8111* (2013.01); *B60G 2206/91* (2013.01); *F16F 2226/04* (2013.01)

(58) Field of Classification Search
CPC ............ B60G 2204/41; B60G 2204/42; B60G 2204/4404; B60G 2206/50; B60G 2206/8102; B60G 2206/8111; B60G 2206/91; F16F 1/3842; F16F 2226/04
USPC ........................................................ 267/293
See application file for complete search history.

(56) References Cited

U.S. PATENT DOCUMENTS

| | | | | |
|---|---|---|---|---|
| 2,324,997 A * | 7/1943 | Brown | ................... | B60G 11/12 267/269 |
| 8,192,106 B2 * | 6/2012 | Vogler | ................... | F16F 1/3863 403/372 |
| 8,973,909 B2 * | 3/2015 | Noble | ................... | B60G 9/00 267/293 |
| 9,016,971 B2 * | 4/2015 | Masi | ................... | F16F 1/3842 403/228 |

FOREIGN PATENT DOCUMENTS

| | | | | |
|---|---|---|---|---|
| CN | 103185068 A | | 7/2013 | |
| DE | 10 2012 218 458 A1 | | 6/2014 | |
| DE | 202014105169 U1 * | | 12/2014 | ............... B60G 3/14 |
| DE | 10 2014 203 241 A1 | | 8/2015 | |
| DE | 10 2015 210 151 A1 | | 12/2016 | |
| EP | 3 208 490 A1 | | 8/2017 | |
| JP | 3-239686 A | | 10/1991 | |
| KR | 10-2018-0064101 A | | 6/2018 | |

OTHER PUBLICATIONS

PCT/EP2019/074678, International Search Report dated Jan. 13, 2020 (Two (2) pages).
German Search Report issued in German application No. 10 2018 125 459.8 dated Aug. 6, 2019, with Statement of Relevancy (Ten (10) pages).

* cited by examiner

FASTENING ARRANGEMENT OF A VIBRATION DAMPER

BACKGROUND AND SUMMARY OF THE INVENTION

The invention relates to a fastening arrangement of a vibration damper for a vehicle, in particular of a damper/suspension spring unit, to a wheel support and/or to the vehicle body via a rubber bearing by means of a fastening means, by way of which one of at least two bushes of the rubber bearing is fixed in the three degrees of longitudinal freedom with regard to the wheel carrier or the vehicle body. With respect to the prior art, reference is made merely by way of example to DE 10 2012 218 458 A1.

During the production of a motor vehicle, in particular a passenger motor car, the components of the chassis are usually preassembled, to be precise on what is known as an axle carrier which is later joined to the vehicle body, which is generally called the "marriage". In the non-joined state of the preassembled chassis, the suspension springs, on which the vehicle body (=bodywork) is supported in the joined state, are completely relieved. After the assembly of the vehicle body and the axle carrier, when the vehicle is deposited on the floor after the marriage and possibly further assembly steps which are carried out on the vehicle which is suspended on a conveyor system, the suspension springs are loaded with the weight of the bodywork and are therefore compressed by a certain amount. This usually applies correspondingly to the vibration dampers (also called only "dampers" in the further text) which are functionally connected in parallel with the suspension springs and are therefore usually moved from a greatly extended state into a partially retracted state in the vicinity of the center position.

After the vehicle body and the preassembled axle carrier with the wheel supports fastened to it are joined together and after the abovementioned state change of the suspension springs and usually also of the dampers, which state change takes place as the complete vehicle is deposited on its wheels for the first time, the wheel supports are as it were transferred from a position, in which they are extended to a relatively great extent, at least approximately into what is known as their construction position. As is known, they assume the latter position, that is to say the "setpoint level", only when the vehicle body is as it were loaded in a standardized manner by way of any possible additional weights, such as a filled fuel tank and an occupant.

As is known, in the case of changes of the level of the wheel support with respect to the vehicle body, the position of the wheel support changes, which position can be described by way of camber angle, toe angle and castor angle. On a damper which is fastened via a rubber bearing by way of a screw or the like to a wheel support and/or to the vehicle body, this leads to the rubber bearing being transferred, starting from a substantially stress-free state during assembly with unloaded suspension springs, into a slightly stressed state when the supporting springs are loaded with the weight of the vehicle body. An elastomer element which is provided between the two bushes of the rubber bearing/bearings which is/are customary with regard to its/their fundamental construction is therefore already stressed or loaded with stress in the construction position, which can have a negative effect on the driving comfort of the vehicle.

DE 10 2012 218 458 A1 discloses a corrective measure for the problem. Here, a fastening arrangement of a vibration damper to a wheel support and/or to the body of a vehicle via a rubber bearing by means of a screw or the like is provided, by way of which screw one of the two bushes of the rubber bearing is fixed in the three degrees of longitudinal freedom with regard to the wheel support or the vehicle body. Here, a measure is provided on the rubber bearing bush and on the wheel support and/or on the vehicle body, by way of which measure the degree of rotational freedom of the rubber bearing bush about the axle of the screw is blocked by way of a positively locking connection. A positively locking connection of this type is formed in DE 10 2012 218 458 A1, for example, via a feather key element between a spherical segment-shaped end section of the rubber bearing bush and a likewise spherical segment-shaped cutout of the wheel support. Furthermore, it is proposed to form the positively locking connection via a suitable shape of the spherical segment-shaped bearing faces of the rubber bearing bush and of the wheel support which face one another, which shape is not rotationally symmetrical with regard to the screw. Here, a shape of this type can be, for example, a square, hexagon or a dihedron. Furthermore, small lugs which protrude from the rubber bearing bush are proposed, which lugs can latch into cutouts provided for this purpose on the wheel support.

All of the shapes which have been mentioned in DE 10 2012 218 458 A1 are associated with high manufacturing complexity and therefore high costs. For instance, the non-symmetrical shape, such as a hexagon or a square, has to be made in a complicated manner in the cavernous, concave and spherical segment-shaped bearing face of the wheel support. To this end, in each case the contour of the shape, that is to say, for example, of the hexagon, the square or the dihedron, has to be machined in the wheel support. This costs time and complexity. Furthermore, on account of the small faces of the shapes on the bearing face of the wheel support and/or the rubber bearing bush, in particular in the case of the abovementioned lugs, incorrect assembly is possible. It is thus possible, for example, that, on account of the small face of the lug and/or of the other shapes, the lug does not latch into the groove or the cutout which is provided for this purpose. Incorrect assembly occurs. The rubber bearing is then not prestressed at all.

Although a positively locking connection is formed between the spherical segments by way of the positively locking block and the degree of rotational freedom of the inner bush of the rubber bearing with regard to the axis of the screw is thus blocked, a manual prestressing process still has to be carried out, in the case of which the rubber bearing bush is rotated into the spherical segment shape of the wheel support and is prestressed as a result. To this end, special prestressing tools are necessary. Furthermore, an additional manufacturing step is produced as a result. This requires additional complexity and costs.

It is therefore an object of the invention to specify a fastening arrangement of a vibration damper, which fastening arrangement avoids the abovementioned disadvantages and can be produced with little complexity, makes a simplified assembly process possible, and at the same time is capable of avoiding possible incorrect assemblies.

This object is achieved in a fastening arrangement of a vibration damper, in particular a damper/suspension spring unit, on a wheel support and/or on the vehicle body (=body of a vehicle or also called bodywork) via a rubber bearing by means of a fastening means, by way of which one of the two bushes is fixed in the or its three degrees of longitudinal freedom with regard to the wheel support. Here, a measure is provided on the rubber bearing bush both on the wheel support and/or on the vehicle body, by way of which measure the degree of rotational freedom of the rubber bearing bush about the axis of the fastening means is blocked by way of a positively locking connection.

Here, in particular, a screw or the like serves as fastening means.

Furthermore, it is provided here that the positively locking block is formed by way of engaging at least one convexly curved cylinder segment (also called a convex cylinder segment) of the rubber bearing bush and at least one concavely curved cylinder segment (also called a concave cylinder segment), which matches the former, of the wheel support or the vehicle body into one another. The concave cylinder segment of the wheel support and/or of the vehicle body can also be understood to be a cylinder segment-shaped cutout.

In the context of this invention, a cylinder segment is to be understood to mean, in particular, a circular-cylindrical segment which is straight (and also hollow as a result of a bore in the rubber bearing) and which is of at least approximately symmetrical configuration with regard to the longitudinal axis of the rubber bearing (in the installed state). The concave cylinder segment is as it were the wall of a circular-cylindrical segment, it also being possible for it to be called a cutout in the form of the wall of a segment of a circular cylinder.

It is preferably provided here that the vibration damper of the vehicle is supported on an outer bush of the rubber bearing by way of, for example, a bearing socket. An inner bush of the rubber bearing is further preferably fastened or screwed on the wheel support and/or on the vehicle body, or is stressed with respect to the latter, by means of the fastening means, in particular a screw.

The rubber bearing bush (in particular, inner bush) which interacts functionally with the screw lies with its end section which faces the wheel support, that is to say with the convex cylinder segment, on the correspondingly designed bearing region of the wheel support and/or of the vehicle body, that is to say the concave cylinder segment.

In contrast to the prior art, the engaging regions of the rubber bearing or of the wheel support or of the vehicle body are not spherical segments, but rather cylinder segments. This has the advantage, in particular, that the manufacturing of the bearing faces or the engaging regions, in particular the region of the wheel support and/or vehicle body, is considerably simpler and therefore less expensive. Further details in this respect will be described further during the description.

In order that a positively locking connection is possible between the convex cylinder segment of the rubber bearing bush and the concave cylinder segment of the wheel support and/or of the vehicle body, it is provided that the cylinder segments are configured in such a way that they can engage into one another and form a positively locking connection.

Here, the positively locking block is preferably arranged or configured in such a way that, in the case of the vibration damper being mounted on the wheel support and/or on the vehicle body, without loading of the wheel support by way of the vehicle body, the vibration damper is positioned for exact stressing or fixing by way of the fastening means (in particular, by way of the screw or the like) with respect to the wheel support and/or the vehicle body in such a way that the rubber bearing, more precisely an elastomer element of the rubber bearing, is at least approximately stress-free or is transferred into a defined stress state in the construction position, that is to say with a standard loading of the wheel support by way of the vehicle body, at any rate with regard to the degree of rotational freedom.

It is provided here that the damper is mounted in a defined position or location on the wheel support and/or on the vehicle body via the rubber bearing which, as has already been mentioned, usually has an external outer bush which is connected substantially rigidly to the damper housing and an internal inner bush which is connected substantially rigidly to the wheel support and/or the vehicle body via the fastening means, in particular the screw or the like, and an annular elastomer element between the two bushes.

The position or location of the damper and therefore also of the rubber bearing with its abovementioned bushes and the elastomer element which lies in between is preferably defined or fixed in such a way that the elastomer element of the rubber bearing is slightly stressed within itself, as viewed in the rotational direction about the rotational axis of the screw which fixes the rubber bearing, when, during the course of the abovementioned "marriage", that is to say the joining of the vehicle body and the preassembled axle carrier, the damper is fastened with its two ends fixedly to the vehicle body on one side and to the wheel support on the other side, without the wheel support being loaded proportionately by way of the weight of the vehicle body. This stressing in the elastomer element, which stressing is applied during the fixing of the damper position with respect to the vehicle body and the wheel support without loading of the wheel support by way of the vehicle body, is selected or fixed by way of the defined assembly position in such a way that the stressing is dissipated automatically at least approximately when the wheel support is loaded by way of the vehicle body proportionately, that is to say with its proportion (in the case of a customary passenger motor car, this is approximately 25%), and therefore assumes its construction position with regard to the vehicle body.

During the fastening or assembly of the damper between the vehicle body and the wheel carrier, a stress is therefore built up in the associated damper rubber bearing without loading of the suspension spring which is assigned to the damper, which stress is subsequently dissipated automatically by way of standardized loading of the suspension spring, by way of which the wheel support assumes or passes into its construction position with respect to the vehicle body.

The invention is then particularly satisfactorily suitable for work to be carried out or for work to be able to be carried out reliably in the mass production of motor vehicles in the above-described way, that is to say in accordance with the method which is described above. Although it is theoretically fundamentally possible for a vibration damper which is fastened via a rubber bearing to a wheel support and/or to the vehicle body to be mounted fixedly on the wheel bearing or motor vehicle body, even without a block by way of a positively locking connection, in a defined position which is such that, during assembly of the vibration dampers between the wheel supports and the vehicle body with non-loaded suspension springs, a desired stress is generated in the elastomer elements of the damper rubber bearings, it is ensured reliably in large-scale production that the desired prestress is actually generated in the respective elastomer element during the damper assembly without loading of the associated suspension spring only when the position of the damper with respect to the wheel support and the vehicle body is stipulated exactly during the assembly and the position is also maintained exactly. The latter is ensured when the damper can be fastened in a way according to the invention to the wheel support or to the vehicle body only in a defined position or location.

This, namely a fastening possibility only in a defined position, can be provided relatively simply by way of a positively locking connection for large-scale production. In this regard, the positively locking block of the degree of rotational freedom of the rubber bearing bush which is to be fastened to the wheel support and/or to the vehicle body by way of, for example, a or the screw, the positively locking connection being realized by way of two cylinder segments which engage into one another (one curved concavely, the other curved convexly), is the essential feature, for which patent protection is requested. The local or spatial fixing of the positively locking block which is described in claim 4 is, in contrast, one preferred application for the underlying invention of blocking the degree of rotational freedom of preferably the inner bush of the rubber bearing, by way of which a vibration damper is fastened to a wheel support in the chassis of a vehicle, in particular a passenger motor car, and/or to the vehicle body. In addition, patent protection is also claimed for the method mentioned below, in the case of which a damper is assembled in such a way that, without loading of the associated suspension spring, a stress is built up in the rubber bearing which supports the damper or in its elastomer element, which stress is automatically substantially dissipated by way of the loading of the associated suspension spring, with the result that the elastomer element is substantially stress-free with a standard loading and therefore in the construction position with regard to the degree of rotational freedom of the rubber bearing, which degree of rotational freedom is blocked by way of the fastening means, in particular by way of the preferred screw as fastening means.

In the further text, merely fastening according to the invention of a vibration damper to a wheel support is spoken of for the sake of simplicity, without hereby ruling out the possibility of analogous damper fastening to the vehicle body.

It is provided in one preferred embodiment of the invention that the cross section parallel to the cylinder longitudinal axis of the concave cylinder segment of the wheel support and/or of the cylinder segment-shaped cutout on the wheel support is of at least slightly wider configuration than the cross section parallel to the cylinder longitudinal axis of that convex cylinder segment of the cylinder bearing bush. That cross section is addressed here which runs parallel to the cylinder longitudinal axis of the cylinder segment. Here, the width of the cross section is the dimension or the size of the cross section along the cylinder longitudinal axis of the cylinder segment.

Here, the cross section of the concave cylinder segment of the wheel support is preferably precisely so much wider that the convex cylinder segment rotates by itself during assembly, only as a result of advancing of the segments toward one another, and thus slips or moves into the concave cylinder segment of the wheel support.

Accordingly, it is preferably provided that the cross section of the concave cylinder segment is configured to be from 0.1% to 10% wider than the cross section of the convex cylinder segment. As an alternative, however, it is also possible that the concave cylinder segment is of considerably wider configuration in its cross section, with the result that, for example, there are no boundaries of the cylinder segment in the direction of the cylinder longitudinal axis of the cylinder segment.

Additional manual rotation of the rubber bearing bush, with the result that the convex cylinder segment is positioned in such a way that it can be fitted or moved into the cylinder segment-shaped cutout of the wheel support, is then no longer necessary. A detailed description of this method will be described further below in the later course of the description.

An additional manufacturing step can thus be saved by way of a somewhat larger concave cylinder segment of the wheel support with respect to the convex cylinder segment of the rubber bearing bush. Here, that manufacturing step can be saved, in the case of which the rubber bearing bush has to be rotated manually, in order that the convex cylinder segment is positioned in such a way that it can be inserted into the wheel support merely by way of being advanced. In the prior art, the rotational movement of the rubber bearing bush for positioning of the cylinder segment usually takes place by way of a stressing tool being attached by a factory worker, and subsequent rotation of the tool. As a result of the preferred embodiment of a larger concave cylinder segment of the wheel support than the convex cylinder segment of the rubber bearing bush, a stressing tool of this type and the entire manual stressing process can be saved. The stressing namely takes place automatically, without any manual intervention merely by way of advancing. In this way, a manufacturing step can be dispensed with and costs can be saved.

Furthermore, it is preferably provided that the positively locking connection is configured by way of the cylinder segments which engage into one another. As has already been mentioned, it is preferably provided here that the cylinder segments are what are known as straight cylinder segments. It is further preferred here that the cylinder segment is produced by way of a circular cylinder which is sectioned parallel to the cylinder axis. The surface, with a semicircular cross section, of the cylinder segment is then preferably the frontmost (as viewed with regard to the insertion direction of the convex cylinder segment) face of the convex cylinder segment. Here, all other faces of the cylinder segment are preferably of planar or flat or level (that is to say, not curved) configuration.

Here, in one preferred state, the cylinder segments are configured as a square in a cross section parallel to the cylinder longitudinal axis.

As an alternative to this, it is likewise possible that the positively locking block is formed by way of engaging of two convex cylinder segments of the rubber bearing bush and two concave cylinder segments of the wheel carrier and/or of the vehicle body in one another. The rubber bearing bush then comprises two convex cylinder segments, and the wheel support comprises two concave cylinder segments. Here, the cylinder segments are preferably arranged perpendicularly with respect to one another per component, with the result that they form a circular shape in their cross section (with a section parallel to the respective cylinder longitudinal axis).

Here, the circular shape has, in particular, that advantage over the prior art that an incorrect assembly can be avoided on account of the large faces of the "cross". Unnoticed "non-latching" of the cross shape of the rubber bearing bush into the cross-shaped cutout in the wheel support (or vice versa) can advantageously be avoided due to the cross having a large surface.

Furthermore, in comparison with the prior art, it is considerably simpler to produce a cross shape of this type on the rubber bearing bush and, in particular, on the wheel support.

In order to introduce the fastening means, in particular the screw or the like, it is provided that both the rubber bearing bush and the wheel support have a bore. In the installed or assembled state, the longitudinal axes of the bores then substantially correspond.

Furthermore, a method for producing a fastening arrangement is provided.

Here, in a first step, the convex cylinder segment of the rubber bearing bush is displaced in the direction of the concave cylinder segment or the cylinder segment-shaped cutout of the wheel support. Here, the displacement preferably takes place in such a way that the longitudinal axis or rotational axis of the rubber bearing bush coincides with the longitudinal axis of the bore within the concave cylinder segment of the wheel support.

Here, this displacement operation takes place until a first edge of the convex cylinder segment of the rubber bearing bush makes at least punctiform contact with an edge of the concave cylinder segment. Here, an upper (as viewed in the vehicle vertical direction) edge of the convex cylinder segment and an upper (as viewed in the vehicle vertical direction) edge of the concave cylinder segment come into contact with one another, in particular. At the same time, it is possible that a lower edge of the convex cylinder segment and a lower edge of the concave cylinder segment also come into contact with one another.

Contact of this type of the respective edges of the two segments takes place, since the two cylinder segments are not yet positioned with respect to one another during this assembly step in such a way that they are pushed in an ideal manner into one another and can engage into one another.

Although the rotational axes (of the bore of the wheel support and of the rubber bearing) already substantially coincide here, the two cylinder segments can engage into one another only after a corresponding rotation about the rotational axis of the preferred screw or about the longitudinal axis of the rubber bearing of the convex cylinder segment, and can form the positively locking connection. As a result of the rotation of the rubber bearing bush about the bearing longitudinal axis, the elastomer element in the rubber bearing is rotated and is prestressed as a result.

The rotation of the rubber bearing bush, that is to say the actual prestressing process, can take place in different ways here.

If, as provided in one preferred embodiment of the invention, the cross section (parallel to the cylinder longitudinal axis) of the concave cylinder segment of the wheel support is of at least slightly wider configuration in the direction of the cylinder longitudinal axis of the cylinder segment than that of the convex cylinder segment of the rubber bearing bush, a manual prestressing process is no longer necessary. Instead, the convex cylinder segment is rotated by itself by way of an advantageous sliding and force relationship into the concave cylinder segment, in the case of a further advance in the direction of the common longitudinal axis of the bores.

If the cross sections (parallel to the cylinder longitudinal axis) of the cylinder segments are selected to be approximately equally wide as viewed in the direction of the cylinder longitudinal axis (that is to say, in the form of an interference fit), it is preferably provided that the rubber bearing bush is rotated manually, for example in a further manufacturing step, and the convex cylinder segment is subsequently displaced into the concave cylinder segment. The prestressing process therefore takes place manually in the case of the example.

In the case of a manual prestressing process, it is also not necessary that the edges of the segments first of all come into contact or the two cylinder segments are displaced toward one another before rotation of the rubber bearing bush takes place.

After the positively locking connection has taken place between the rubber bearing bush and the wheel support (and/or the vehicle body), the rubber bearing can be fixed on the wheel support in the prestressed position. Here, the fixing preferably takes place by way of tightening of the screw. The prestress during the assembly process makes it possible that the rubber bearing is in a stress-free state in the construction position of the vehicle.

As has already been mentioned further above, it is preferably provided, furthermore, that the concave cylinder segment of the wheel support and/or of the vehicle body is produced by a machining method, in particular a milling operation. It is particularly preferred here that a side milling cutter produces the concave cylinder segment or segments by way of being inserted once or, in the case of two cylinder segments, by way of being inserted twice. In contrast to the prior art, the contours of the shapes for the positively locking connection do not have to be moved along individually by way of a milling operation. On account of the shape of a cylinder segment, it is merely required that a suitable milling cutter is inserted into the wheel support once or multiple times (depending on the number of cylinder segments). As a result, the manufacturing complexity of the concave cylinder segment of the wheel support is considerably facilitated in comparison with the prior art. Costs and time are lowered in this way.

In addition to a milling method, another machining method is likewise conceivable.

Here, the convex cylinder segment or segments of the rubber bearing bush is/are preferably produced in a cold working process, in particular in a punching process as a punched part. As an alternative, it is also possible for the convex cylinder segment to be produced by way of forging process or by way of a hot forming method.

These and further features are also apparent from the drawings in addition to from the claims and from the description, it being possible for the individual features to be realized in an embodiment of the invention in each case per se on their own or severally in the form of subcombinations, and to represent advantageous embodiments which are patentable per se and for which protection is claimed here.

In the following text, the invention will be described further on the basis of two exemplary embodiments. Here, all of the features which are described in greater detail can be essential to the invention.

DETAILED DESCRIPTION OF THE DRAWINGS

Figure 1:
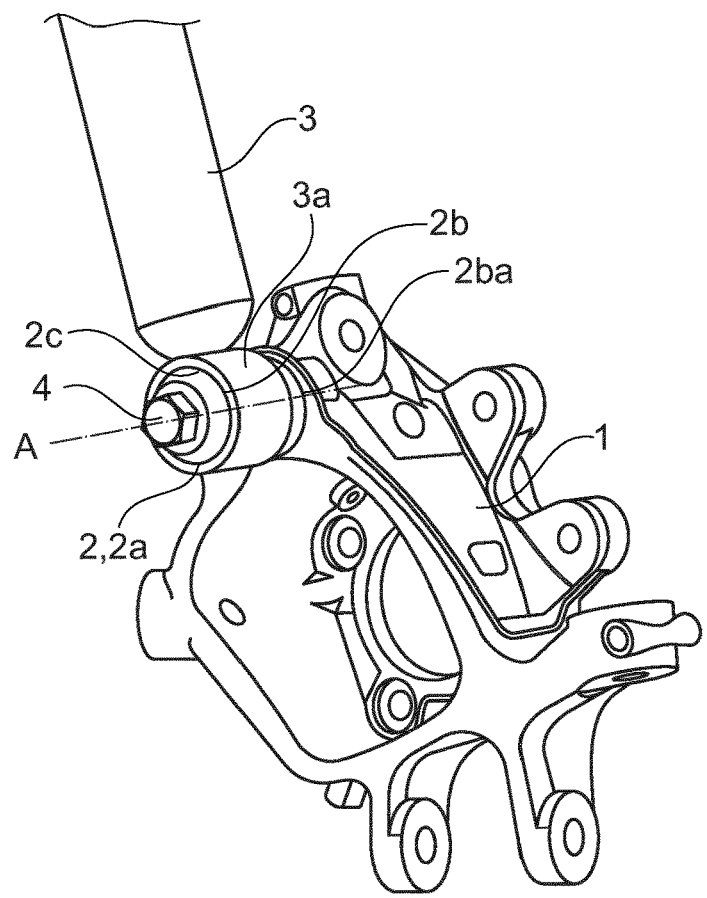
FIG. 1 shows a three-dimensional partial view of a wheel support 1 with an attached rubber bearing 2 which supports a vibration damper 3, of which only the part which is directly adjacent to the rubber bearing 2 can be seen, or via which the damper 3 is fastened to the wheel carrier 1. Here, it is once again to be noted that, instead of the wheel support 2, a suitable section of the vehicle body can also be shown, to which the damper 3 is fastened via a rubber bearing 2 in a corresponding way according to the invention. Otherwise, it goes without saying that that end of the vibration damper 3 which lies opposite the wheel support 1 is also fastened to the vehicle body in the case of the described exemplary embodiment, but in a conventional way there, the damper 3 preferably being a constituent part of a damper/suspension spring unit which, furthermore, has a suspension spring (not shown) and is supported in its entirety in what is known as a supporting bearing on the vehicle body.

FIG. 1 shows a rubber bearing 2, on the outer bush 2a of which a vibration damper 3 is supported by way of its bearing socket 3a, and the inner bush 2b of which rubber bearing 2 is fastened to the wheel carrier 1 by means of a screw 4, that is to say is screwed onto it or is stressed with respect to it. As is customary, an elastomer element 2c of annular cross section is situated between the two bushes 2a, 2b. The inner bush 2b which interacts functionally with the screw 4 lies with its end section which faces the wheel support 1 on the bearing region of corresponding design of the wheel support 1. Here, a measure is provided on the inner bush 2b and on the wheel support 1, by way of which measure the degree of rotational freedom of the inner bush 2b about the axis A (longitudinal axis, rotational axis) of the screw 4 is blocked by way of a positively locking block. The positively locking block, as can be seen in the following figures, is formed by way of engaging at least one convexly curved cylinder segment 2ba of the inner bush 2b and at least one concavely curved cylinder segment 1a of the wheel support 1 into one another.

Figure 2:
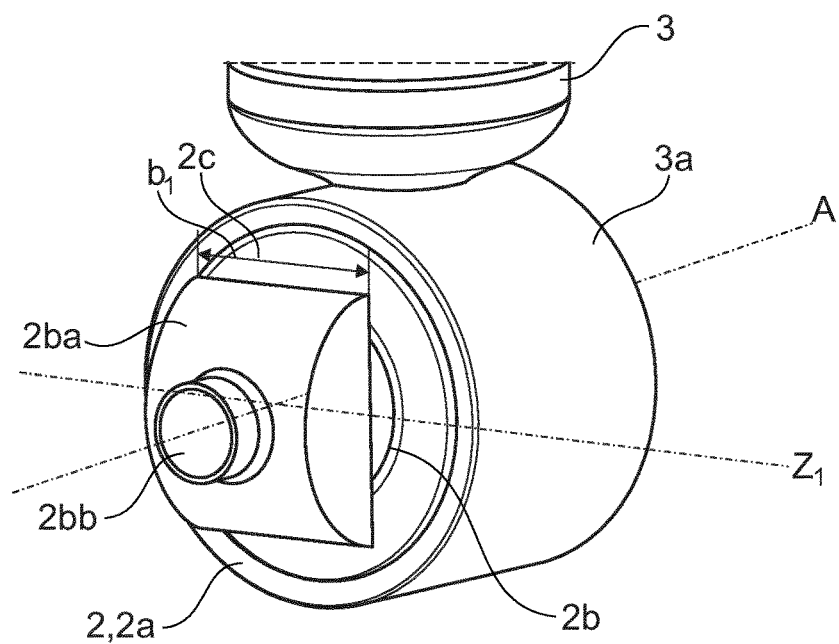
FIG. 2 shows a detailed view of the end section of the damper 3 which is connected to the rubber bearing 2. Here, in particular, that side of the rubber bearing 2 can be seen which is directed in the direction of the wheel support 1 or engages into the wheel support 1 in the installed state.

Here, FIG. 2 shows a three-dimensional detailed view of the bearing socket 3a of the rubber bearing 2 with an inner bush 2b which has the convexly curved cylinder segment 2ba (also called the convex cylinder segment 2ba) in its end region which faces the wheel support 1 in the installed state. Here, the curved outer edge of the convex cylinder segment 2b forms a circular section or a circular segment in its cross section.

Furthermore, the end region at the end of the convex cylinder segment 2ba comprises a hollow-cylindrical shoulder 2bb, through which the screw 4 is plugged and which provides an axial (in the direction of the rotational axis A of the bearing 2) guide for the assembly described below of the damper 3 on the wheel support 1. Here, the hollow-cylindrical shoulder 2bb is arranged on the convex cylinder segment 2ba in such a way that the longitudinal axis of the hollow-cylindrical shoulder 2bb lies on the longitudinal axis of the rubber bearing 2 or represents an extension of the latter.

In contrast with the prior art, the positively locking connection is not formed by way of a spherical segment as end region, but rather by way of a cylinder segment. This has considerable advantages, in particular, with regard to economic manufacturing.

Figure 3:
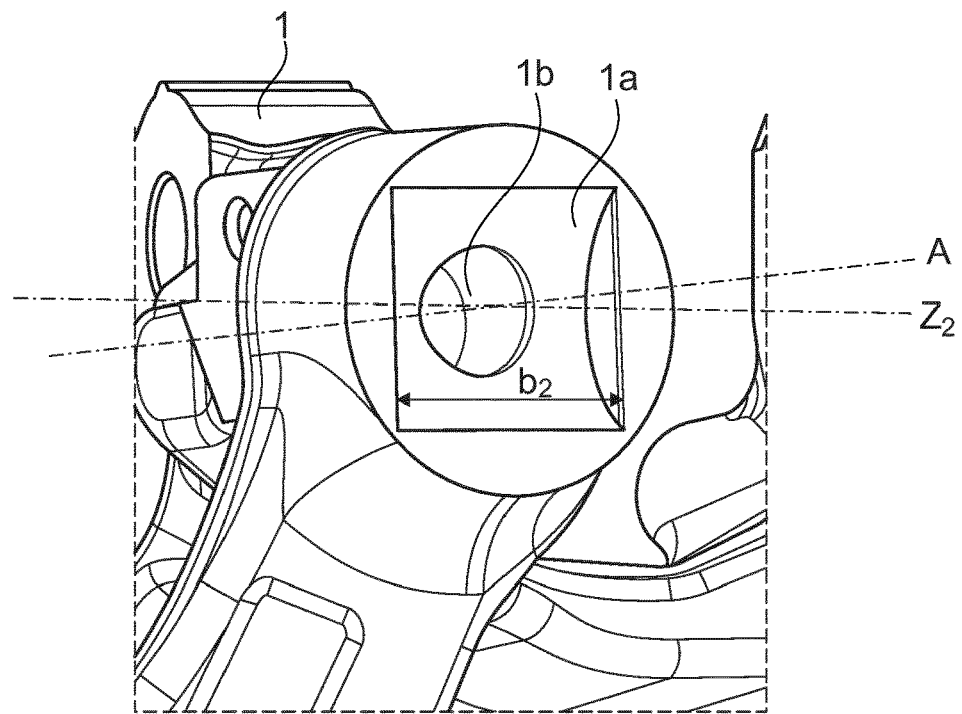
FIG. 3 is a three-dimensional detailed view of the part of the wheel support 1 from FIG. 1 in the case of which the rubber bearing 2 is connected to the part of the wheel support 1.

FIG. 3 shows that region of the wheel support 1, into which the convex cylinder segment 2ba of the inner bush 2b engages during the assembly. To this end, the wheel support 1 comprises a curved cylinder segment-shaped cutout 1a or concavely curved cylinder segment 1a (also called a concave cylinder segment 1a). Furthermore, in the interior of the curved cylinder segment cutout 1a, the wheel support comprises a through bore 1b, into which the hollow-cylindrical shoulder 2bb of the inner bush 2b engages during assembly and thus makes axial (in the direction of the rotational axis A of the rubber bearing 2 and/or of the screw 4) guidance of the inner bush 2b in the wheel support 1 possible.

Here, in terms of its shape, the concave cylinder segment 1a is preferably to be considered as it were as a negative shape with respect to the convex cylinder segment 2ba of the rubber bearing 2, with the result that the convex cylinder segment 2ba can engage into the concave cylinder segment 1a and therefore forms the required positively locking connection.

In contrast to the spherical segments which are known from the prior art, the shown concave cylinder segment 1b of the wheel carrier 1 is considerably simpler and less complicated to produce. Here, it is merely necessary that, for example, a suitable milling cutter, in particular a side milling cutter, is inserted once per cylinder segment into the wheel support 1, the desired cylinder segment shape being achieved or produced.

Figure 4:
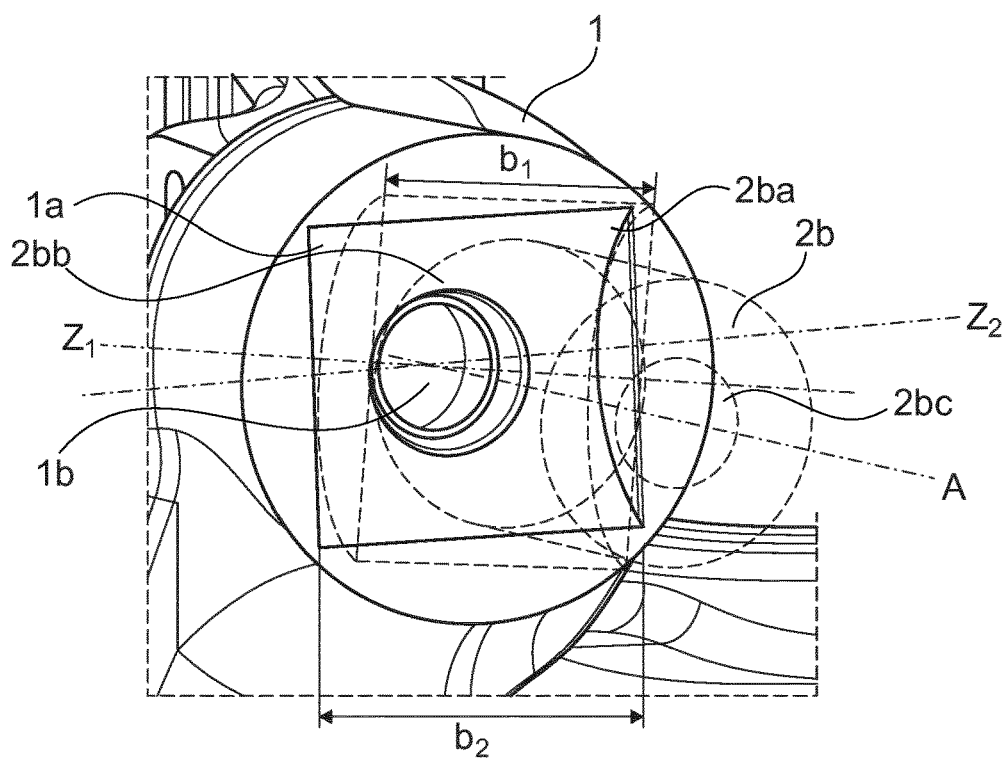
FIG. 4 shows the first step of the assembly of the rubber bearing 2 or, in this case, only the rubber bearing bush 2b of the rubber bearing 2, which rubber bearing bush 2b attempts to engage into a concavely curved cylinder segment-shaped cutout 1a of the wheel support 1 by way of a convexly curved cylinder segment 2ba.
Figure 5:
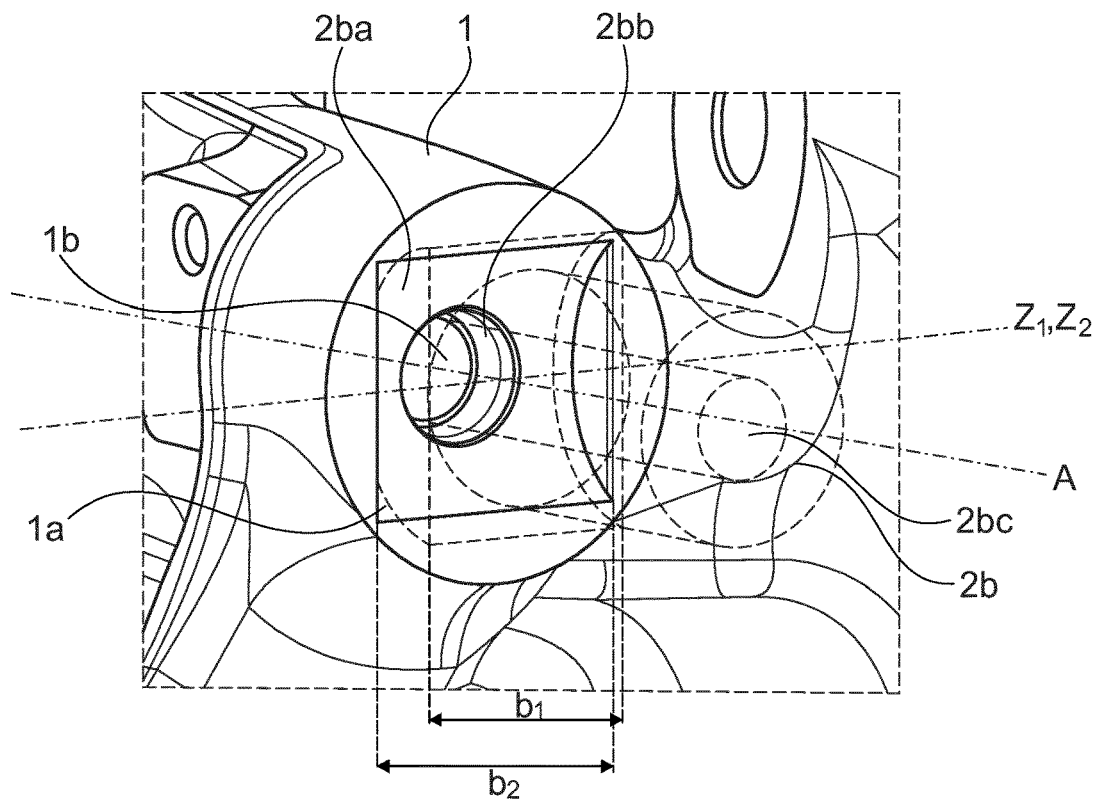
FIG. 5 shows the next step of the assembly following FIG. 4.

FIGS. 4 and 5 show two assembly steps which follow one another of the rubber bearing 2 with the damper 3 (or, in this case, only the inner bush 2b of the rubber bearing 2 is shown for the sake of clarity) from FIG. 2 on the wheel support 1 from FIG. 3. Here, the inner bush 2b is shown in a transparent state, in order to see the positively locking connection of the two cylinder segments 2ba, 1a in more detail.

In a first assembly state, as shown in FIG. 4, the damper 3 with the rubber bearing 2 or the inner bush 2b with its convexly curved cylinder segment 2ba is displaced in the direction of the concavely curved cylinder segment 1a of the wheel support 1 along the rotational axis A of the screw 4 and/or of the rubber bearing 2. It is provided here that, during the displacing operation, the rotational axis A of the rubber bearing 2 coincides with the rotational axis A of the screw 4 in the installed state and/or with the longitudinal axis of the bore 1b of the wheel support. The inner bush 2b is therefore displaced along the rotational axis A of the screw 4 in the direction of the wheel support 1. The displacement operation then takes place until the convex cylinder segment 2ba of the inner bush 2b bears with its circular section-shaped edge against the edges of the concavely curved cylinder segment 1a of the wheel support 1.

Here, the hollow-cylindrical shoulder 2bb engages into the bore 1b, and supports the connection axially (in the direction of the rotational axis) and/or guides the inner bush 2b axially.

In order that the convexly curved cylinder segment 2ba of the inner bush 2b can enter into a positively locking connection with the concavely curved cylinder segment 1a of the wheel support, it is necessary that the convex cylinder segment 2ba is rotated about its rotational axis A to such an extent that it can be pushed into the concave cylinder segment 1a or slides into the latter.

It is provided here in one preferred exemplary embodiment that the cross section parallel to the cylinder longitudinal axis $Z_2$ of the concave cylinder segment $1a$ of the wheel support $1$ is of at least slightly wider configuration, as viewed in the direction of the cylinder longitudinal axis $Z_2$, than the cross section of the convex cylinder segment $2ba$ in the direction of the cylinder longitudinal axis $Z_1$. The width $b_2$ of the cross section of the concave cylinder segment $1a$ is therefore preferably greater than the width $b_1$ of the cross section of the convex cylinder segment $2ba$.

By way of further advancing along the longitudinal axis A of the rubber bearing $2$, the convex cylinder segment $2ba$ slides with its edges on the edges of the concave cylinder segment, and is rotated (about the rotational axis A) by itself into the concave cylinder segment $1a$. The elastomer element $2c$ therefore rotates as a result of further advancing, and is prestressed in the process.

The abovementioned prestressing, without loading of the associated suspension spring, in the elastomer element $2c$ can be produced by way of the precisely selected position of the damper $3$ and therefore of the inner bush $2b$ with respect to the wheel support $1$ during the assembly. It is thus only possible to connect the inner bush $2b$ to the wheel support $1$ when the inner bush $2b$ has been rotated by the proportion which is stipulated by way of the position of the two cylinder segments $2ba$, $1a$, and therefore prestresses the elastomer element $2c$.

As an alternative to the abovementioned preferred exemplary embodiment, the concave cylinder segment $1a$ of the wheel support $1$ can have the same dimensions as the convex cylinder segment $2ba$. The rotational and therefore prestressing operation can then also take place manually, that is to say, for example, by means of a suitable prestressing tool which is attached on the inner bush $2b$ and rotates the latter.

As can be seen in FIG. 5, the positively locking connection between the concave and the convex cylinder segment $1a$, $2ba$ is established after the prestressing operation, and the wheel support $1$ is connected to the damper $3$ with prestressing of the elastomer element $2c$ of the rubber bearing $2$.

Subsequently, the connection can be fixed by way of tightening of the screw $4$ (not shown in FIG. 5) which protrudes through the through bore $2bc$ of the inner bush $2b$ and the bore $1b$ of the wheel support $1$.

Figure 6:
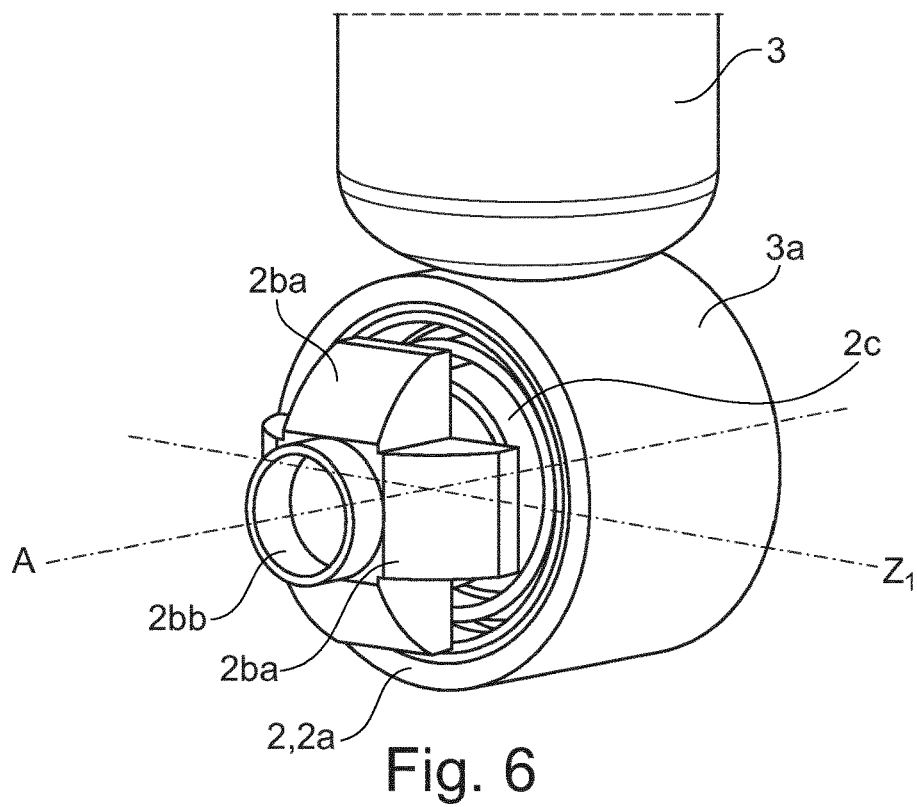
FIG. 6 shows an alternative exemplary embodiment with respect to a rubber bearing 2 or the shape of the rubber bearing bush 2b of the rubber bearing 2 in a three-dimensional view.
Figure 7:
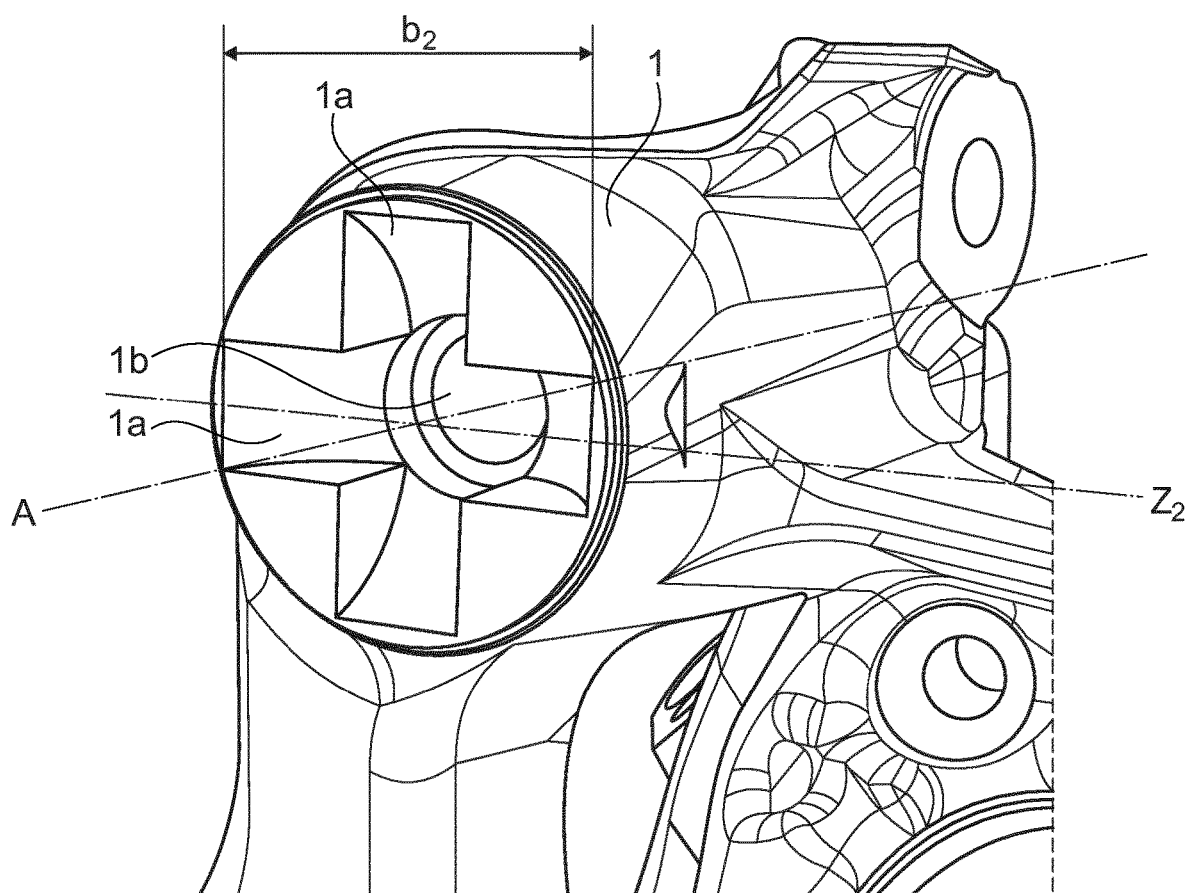
FIG. 7 shows a three-dimensional view of a wheel support section 1 which matches the rubber bearing 2 from FIG. 5.

As an alternative to a single cylinder segment $1a$, $2ba$, it is likewise possible that the positively locking connection is established by way of a plurality of cylinder segments $1a$, $2ba$, for example, as shown in FIG. 6 and FIG. 7, by way of two cylinder segments $1a$, $2ba$. It is preferably provided here, as shown in FIG. 6 in a detailed view of the bearing socket $3a$ and the inner bush $2b$ (in a view which is analogous to that of FIG. 2) that the two convex cylinder segments $2ba$ are arranged with respect to one another in such a way that they form a cross shape in their cross section (sectioned parallel to the cylinder longitudinal axis Z1, Z2). Here, FIG. 7 shows the associated wheel support $1$ with the two concave cylinder segments $1a$ which likewise form a cross shape.

In order to produce the concave cylinder segments $1a$ of the wheel support from FIG. 7, a machining tool, such as a milling cutter, in particular a side milling cutter, has to be inserted twice, instead of once, into the wheel support $1$. This is also considerably simpler in contrast to following their precise contour in the case of a spherical segment-shaped cutout from the prior art.

Furthermore, a cross shape of this type has the advantage that there is improved support of the convex cylinder segment on the concave cylinder segment as a result of multiple punctiform contacts in a plurality of directions (namely, in this case, in each case the direction of the present cylinder longitudinal axes Z1, Z2). As a result, more precise setting of the position of the segments with respect to one another is possible, it being possible for the tolerances in the case of the later prestressing to be lowered.

LIST OF REFERENCE CHARACTERS

1 Wheel support
$1a$ Concave cylinder segment
$1b$ Bore
2 Rubber bearing
$2a$ Outer bush
$2b$ Inner bush
$2ba$ Convex cylinder segment
$2bb$ Shoulder
$2bc$ Bore
$2c$ Elastomer element
3 Damper
$3a$ Bearing socket
4 Screw
A Rotational axis
Z1 Cylinder longitudinal axis of the convex cylinder segment
Z2 Cylinder longitudinal axis of the concave cylinder segment
$b_1$ Width of the cross section of the convex cylinder segment
$b_2$ Width of the cross section of the concave cylinder segment

What is claimed is:

1. A fastening arrangement of a vibration damper of a vehicle, comprising:
  a rubber bearing with a first bush and a second bush;
  a fastener, wherein via the fastener one of the first bush and the second bush of the rubber bearing is fixed in three degrees of longitudinal freedom with regard to a wheel support of the vehicle or the body of the vehicle; and
  a measure disposed on the second bush and on the wheel support or on the body of the vehicle, wherein via the measure a degree of rotational freedom of the second bush about an axis of the fastener is blocked by a positively locking block;
  wherein the positively locking block is formed by a convexly curved cylinder segment of the second bush and a concavely curved cylinder segment of the wheel support or the body of the vehicle that are engageable into one another.

2. The fastening arrangement according to claim 1, wherein a cross section parallel to a cylinder longitudinal axis of the concavely curved cylinder segment is of wider configuration in a direction of the cylinder longitudinal axis than a cross section parallel to a cylinder longitudinal axis of the convexly curved cylinder segment which is insertable into it in the direction of the cylinder longitudinal axis.

3. The fastening arrangement according to claim 1, wherein the fastener is a screw.

4. The fastening arrangement according to claim 1, wherein the positively locking block is disposed such that in a configuration where the vibration damper is mounted on the wheel support or on the body of the vehicle without loading of the wheel support by way of the body of the vehicle, the vibration damper is positioned for stressing by way of the fastener with respect to the wheel support and/or the body of the vehicle such that, with loading by way of the body of the vehicle, an elastomer element of the rubber bearing is at least approximately stress-free or has a defined stress state in a construction position with regard to the degree of rotational freedom.

5. The fastening arrangement according to claim 1, wherein the convexly curved cylinder segment and the concavely curved cylinder segment have a quadrangular configuration in a cross section parallel to a respective cylinder longitudinal axis.

6. The fastening arrangement according to claim 1, wherein the positively locking block is formed by two convexly curved cylinder segments of the second bush and two concavely curved cylinder segments of the wheel support or the body of the vehicle that are engageable into one another and wherein the two convexly curved cylinder segments of the second bush and the two concavely curved cylinder segments of the wheel support or the body of the vehicle are disposed with respect to one another such that they produce a cross shape in a cross section parallel to a respective cylinder longitudinal axis.

7. A method for producing the fastening arrangement according to claim 1, comprising the steps of:
displacing the convexly curved cylinder segment of the second bush in a direction of the concavely curved cylinder segment of the wheel support or the body of the vehicle such that respective longitudinal axes of a bore of the concavely curved cylinder segment and of the rubber bearing lie on one another until at least a first edge of the convexly curved cylinder segment makes contact with at least a first edge of the concavely curved cylinder segment of the wheel support or the body of the vehicle;
pushing the convexly curved cylinder segment of the second bush into the concavely curved cylinder segment of the wheel support or the vehicle body after further displacing of the convexly curved cylinder segment of the second bush along the longitudinal axes in the direction of the concavely curved cylinder segment of the wheel support or the body of the vehicle which results in a rotation of the convexly curved cylinder segment about the longitudinal axis of the rubber bearing;
wherein as a result of the rotation an elastomer element of the rubber bearing is prestressed; and
subsequent fixing of the rubber bearing on the wheel support or on the body of the vehicle by fastening via the fastener.

8. The method according to claim 7, wherein the concavely curved cylinder segment of the wheel support or the body of vehicle is produced by a machining method.

9. The method according to claim 7, wherein the convexly curved cylinder segment of the second bush is produced in a cold working method.

10. A method for producing the fastening arrangement according to claim 1, comprising the steps of:
displacing the convexly curved cylinder segment of the second bush in a direction of the concavely curved cylinder segment of the wheel support or the body of the vehicle such that respective longitudinal axes of a bore of the concavely curved cylinder segment and of the rubber bearing lie on one another;
rotating the second bush until the convexly curved cylinder segment is pushable into the concavely curved cylinder segment of the wheel support or of the body of the vehicle;
pushing of the convexly curved cylinder segment into the concavely curved cylinder segment; and
subsequent fixing of the rubber bearing on the wheel support or on the body of the vehicle by fastening via the fastener.

11. The method according to claim 10, wherein the concavely curved cylinder segment of the wheel support or the body of vehicle is produced by a machining method.

12. The method according to claim 10, wherein the convexly curved cylinder segment of the second bush is produced in a cold working method.

* * * * *